United States Patent Office 2,942,414
Patented June 28, 1960

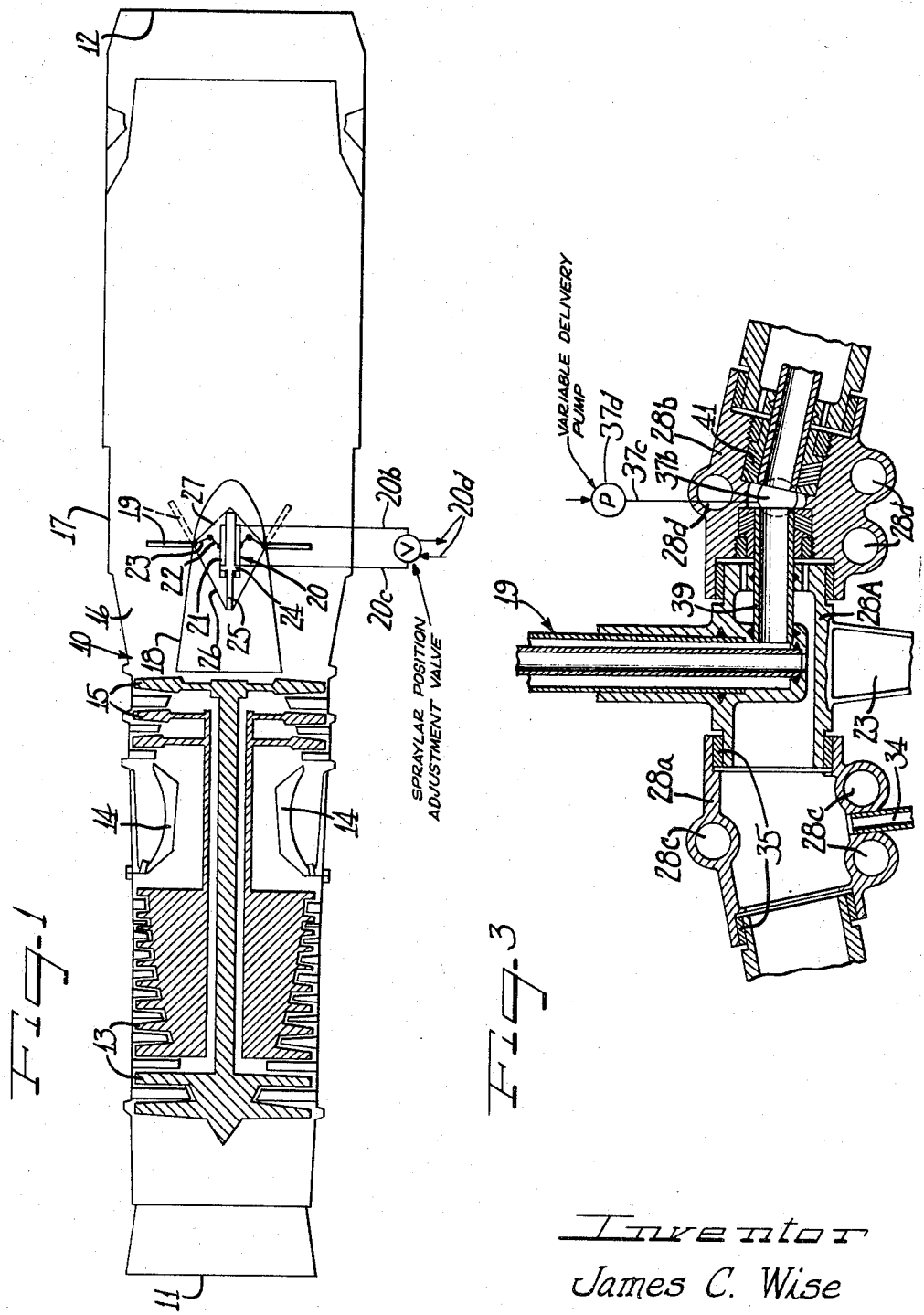

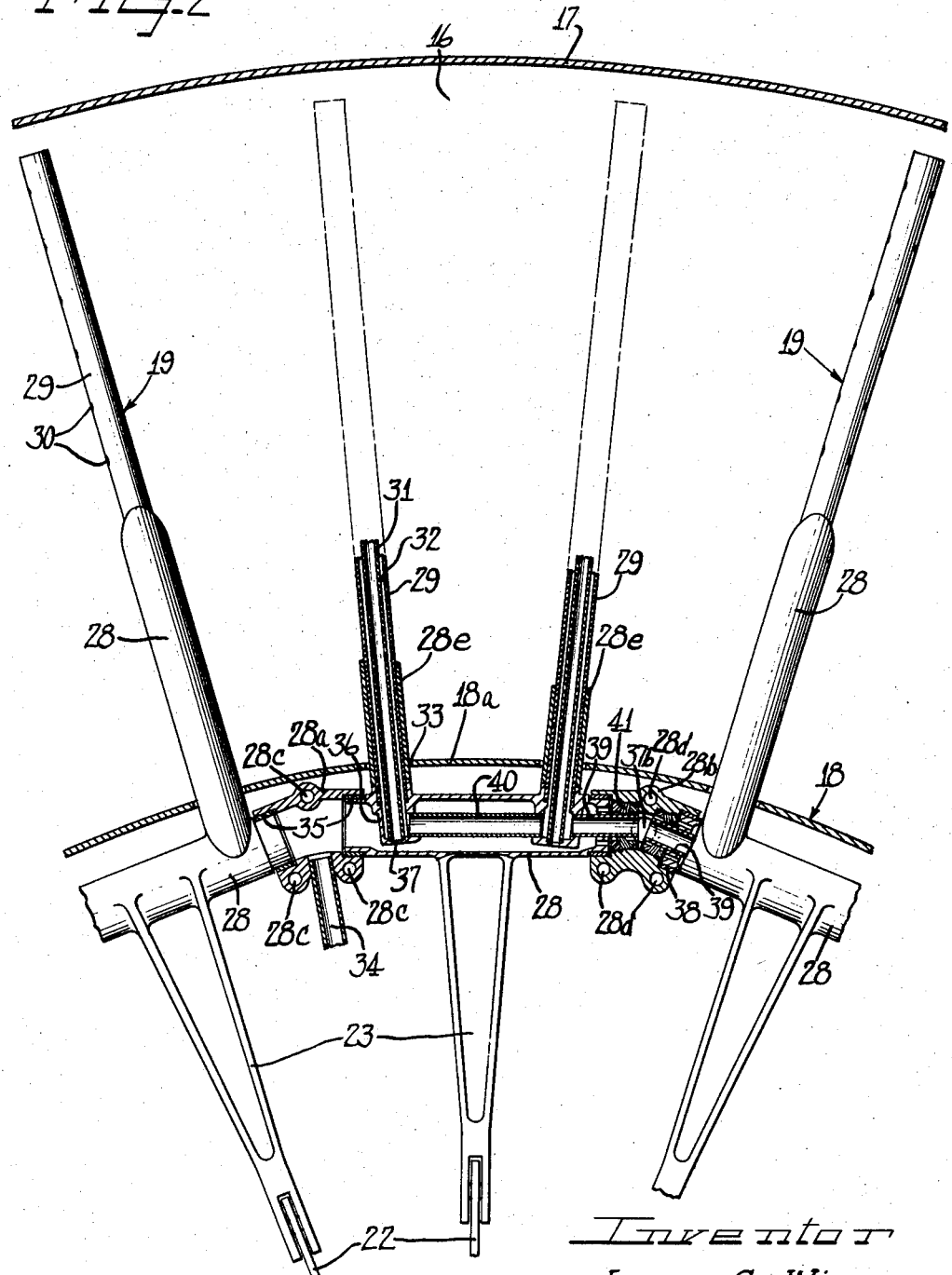

2,942,414
UMBRELLA SPRAYBAR AFTERBURNER ARRANGEMENT

James C. Wise, Euclid, Ohio, assignor to Thompson Ramo Wooldridge Inc., a corporation of Ohio Filed July 3, 1956, Ser. No. 595,693

1 Claim. (Cl. 60—35.6)

This invention relates to improvements in afterburner assemblies for jet engines or the like, and more particularly to means for obtaining variable distribution of fuel in the afterburner chamber. Specifically, this invention deals with an umbrella type spraybar arrangement for an afterburner of a jet engine which substantially improves afterburner efficiency by varying the fuel distribution in accordance with the amount of thrust augmentation desired.

In the present invention, a spraybar arrangement is provided in the afterburner chamber of a jet engine, wherein the spraybars are so constructed and positioned as to pivot on axes which are equispaced tangents about a circumference whose circle is normal to the center line of the jet engine. A remotely controlled air actuator effects the positioning of the spraybars between maximum and minimum thrust augmentation positions. Consequently, this invention controls variations in flame size in the afterburner chamber. While any sort of control lever may be provided for positioning the spraybars, by way of specific example, control of the spraybar scheme will emanate from the main throttle lever. When the throttle is in maximum thrust augmentation position, the spraybar scheme will be in its maximum thrust augmentation position; and when the throttle is in minimum thrust augmentation position, the spraybars will be in their minimum thrust augmentation position.

Accordingly, it is an object of this invention to provide an improved afterburner spraybar arrangement capable of controlling the variations in flame size in the afterburner of a jet engine.

Another object of this invention is in the provision of an afterburner assembly of a jet engine equipped with spraybars that may be variably positioned to variably distribute fuel in the afterburner chamber.

A further object of this invention resides in the provision of a spraybar arrangement for the afterburner chamber of a jet engine, wherein the spraybars are mounted to pivot on axes which are equispaced tangents about a circumference whose circle is normal to the center line of the jet engine.

Another object of this invention is to provide a spraybar arrangement for an afterburner chamber in a jet engine, wherein the spraybars may be adjusted to variably distribute fuel in the afterburner chamber by means of a remote controlled mechanism.

Still another object of this invention is in the provision of a spraybar arrangement for the afterburner chamber of a jet engine, wherein the spraybars are so constructed and positioned that their pivoted position may be infinitely variable between the minimum and maximum thrust augmentation position.

Still another object of this invention is to provide a spraybar arrangement for the afterburner chamber of a jet engine, wherein the spraybars may be variably positioned by remote control through the throttle lever of the engine at any place between the minimum and maximum thrust augmentation positions.

A still further object of this invention resides in the provision of a variable fuel distribution system in the afterburner chamber of a jet engine, wherein weight reduction of the components is accomplished.

Other objects, features, and advantages of the invention will be apparent from the following detailed disclosure, taken in conjunction with the accompanying sheets of drawings, wherein like reference numerals refer to like parts, in which, On the drawings:

Figure 1 is an axial diagrammatic view, with some parts in section and other parts in elevation, of a jet engine equipped with the present invention;

Figure 2 is a greatly enlarged fragmentary transverse sectional view of the jet engine shown in Figure 1 showing the spraybar arrangement of the instant invention, wherein some of the spraybars and component parts are shown in section for purposes of clarity;

Figure 3 is an enlarged fragmentary view in section of the modified spraybar arrangement according to the invention.

As shown on the drawings:

Referring particularly to Figure 1, a typical jet engine 10 is illustrated which includes an intake nozzle 11 for receiving air from the atmosphere and a discharge nozzle 12 for expelling high temperature and high pressure gases generated by the engine which develop jet engine thrust. As the air passes through the engine, it is compressed by multistage axial air flow compressors 13 which discharge high pressure compressed air into combustion chambers or cans 14. Fuel is fed to the combustion chamber 14 to mix with the compressed air and be ignited to discharge high temperature and high pressure gases into turbines 15. These gases expand through the turbines 15, the latter of which serve to drive the compressors 13, and enter an exhaust or afterburner chamber 16.

This afterburner chamber is defined by an outer shell or casing 17 of the jet engine and a tail cone 18 suitably suspended within the shell 17 thereby giving the afterburner chamber a toroidal shape. The expanding gases are then propulsion exhausted through the discharge nozzle 12 to provide thrust for the jet engine.

In order to increase the thrust forces and overall efficiency of the jet engine, additional fuel may be injected into the afterburner chamber 16 for additionally raising the pressure and temperature of the gases passing therethrough. In the instant case, a spraybar arrangement is provided, wherein a plurality of generally circumferentially spaced and radially extending spraybars 19 are pivotally mounted on the tail cone 18 in the area of the afterburner chamber 16. By varying the positions of the spraybars within the range of the spraybars shown in solid line and those shown in dotted lines, varying degrees of fuel distribution and thrust augmentation of the jet engine may be rendered.

In order to provide control of the movement and adjusted position of the spraybars 19, a fluid-operated actuator 20 which is pneumatic or air actuated in the instant case, is suitably mounted within the tail cone 18. This actuator includes a housing or cylindrical casing 21 mechanically connected to the spraybars 19 through a link 22 pivotally connected at one end to the casing 21 and pivotally connected at the other end to an actuating lever 23 which is fixed to a spraybar at its pivot point. The actuator also includes a piston 24 slidably received within the casing 21 and having a stem or rod 25 extending from opposite ends and suitably fixed at its opposite ends to stationary brackets 26 and 27. Pressurized operating air from a suitable source is received and controlled by a spraybar position adjustment valve 20a which is connected to lines 20b and 20c leading to the ends of the cylindrical casing 21. Pressurized air is directed to the ends of the casing by control of the valve from supply and return lines 20d to adjustably control the position of the piston and spraybars. Means may be employed to detect the position of the spraybars or of the piston, or hydraulic fluid may be employed and the valve 20a may be a metering valve so that the position of the piston 24 and of the spraybars may be accurately known for control by the operator. Obviously, the relatively movable parts of the air actuator may be arranged so that the piston 24 is stationarily mounted and the cylinder casing 21 is movably mounted and mechanically linked to the spraybars 19.

Energization of the air actuator for adjusting the position of the spraybars 19 may be effected by any suitable remote control device mounted on the control panel of the jet engine which is not shown for purposes of clarity and since it does not form any part of this invention. Preferably, the remote control device will be operatively connected to the throttle lever of the jet engine to operate in unison therewith. The throttle renders infinitely variable combustion between maximum and minimum thrust conditions, and will be associated with the remote control of the air actuator so as to correspondingly render the spraybar system infinitely variable between maximum and minimum thrust augmentation positions. In other words, when the throttle is in maximum thrust augmentation position, the spraybars will be in their maximum thrust augmentation position, while when the throttle is in minimum thrust augmentation position, the spraybars will be in their minimum thrust augmentation position.

Now referring more specifically to the spraybar arrangement, as shown in Figure 2, it is seen that the actuating levers 23 are integrally connected with a transversely extending hollow spraybar housing or base 28 which is pivotally supported on one end by a bearing and hanger housing 28a and at the other end by a bearing and hanger housing 28b. These bearing housings are provided with mounting holes 28c and 28d respectively for suitable securement to brackets which are also suitably secured to the inner side of the tail cone skin surface 18a. However, for purposes of clarity, these brackets are not shown.

Extending from each hollow spraybar housing are two sets of spraybar arms 28e which support generally radially extending outer tubes 29 of the spraybars 19. As illustrated on one of the spraybars, a plurality of spaced discharge orifices 30 are provided on opposite sides of the outer tube. Within the outer tube 29 and spaced from the inner wall thereof is provided an inner air tube 31 having air orifices (not shown) therealong in substantial alignment with the discharge orifices 30 and defining with the outer tube 29 an annular mixing chamber 32. The spraybars 19 extend through generally longitudinally extending slots 33 formed in the tail cone skin surface 18a.

In the double spraybar arrangement of this embodiment, it will be noted that the spraybars pivot on the axes of the spraybar housings 28 which are equispaced tangents about a circumference whose circle is normal to the center line of the jet engine. Hence, the spraybars are perfectly radial in one direction only. It will also be noted that the spraybars 19 are angularly offset from the axes of the spraybar housing 28. The offset angle, which is the angle between a line perpendicular to the axis of a spraybar housing 28 and the axis of a spraybar 19, can be reduced so that the spraybars may be radial at any desired position, for example 50% thrust augmentation thereby reducing the negligible non-radial error. In Figure 2, the spraybars are shown as radial in the 100% thrust augmentation position, or when they traverse the greater area of the afterburner chamber.

Every other bearing support is one similar to that indicated by the numeral 28a between which is a bearing support similar to that indicated by the numeral 28b. The bearing support 28a is hollow and provided with slightly angularly related socket ends for receiving adjacent ends of the spraybar housings 28. Each bearing support 28a is also provided with an inlet 34 for introducing air therein and to the spraybars 19. At the socket end of the bearing hangers are provided combination main bearing and air seals 35 which serve to journal the adjacent ends of the spraybar housings 28 and seal the bearing supports and the spraybar housings together against any substantial leakage of air.

Extending into the hollow of each spraybar or housing 28 and generally continuous with the outer tube 29 is an integral casing section 36. The inner tube 31 extends to the very bottom of this casing with the open end in alignment with an opening 37 for intercommunicating the hollow of the spraybar housing with the interior of the air tube 31. Thus, air is supplied through the alternate bearing supports 28a for supplying on either side a set of spraybars 19 mounted on a spraybar housing 28. In other words, four spraybars are supplied with air from a single air inlet 34 and bearing support 28a.

Every bearing support 28b is provided with an inlet 37b for connection to a fuel source and for delivering fuel to the spraybars 19. A supply line 37c from a variable delivery pump 37d, connects to the inlet 37b. The bearing hangers 28b are likewise hollow with angularly related sockets at each end for receiving the adjacent ends of a pair of spraybar housings 28. A sleeve bearing and seal 38 is provided between the socket ends of the bearing hanger 28b and the spraybar housings 28, wherein slight leakage is allowed in order to keep the bearings running cooler. Tubular members 39 carry the fuel from the bearing support 28b to adjacent spraybars 19, wherein one end of the tubular members 39 is sealingly received in an aperture of the casing section 36 extending into the hollow of the spraybar housing 28. A similar tubular member interconnects the adjacent casing sections 36 so that both spraybars on each spraybar housing 28 may receive the fuel. The fuel, of course, is directed into the mixing chambers 32 between the inner and outer tubes of the spraybars where it is mixed with the air from the inner air tube.

Referring now more particularly to the tubular members 39 which carry the fuel from the bearing hanger to the first adjacent spraybars, it is seen that these tubular members are intermediately supported by a diametrically reduced end section of the spraybar housing. Since it is important that none of the fuel leaks past the sleeve bearings 38, an additional sealing arrangement is provided for sealing of the external surfaces of the ends of the tubular sections 39 which extend within the bearing supports 28b. This is accomplished generally by means of a swivel seal that is acted upon by the air pressure and the fuel pressure and includes a plurality of spring washers 41 which tend to straighten so that the internal periphery intimately contacts the outer surface of the tubular member 39 and so the outer periphery intimately contacts an inner surface of the bearing supports 28b. Adapters are positioned on opposite sides of these washers to hold them in place and the fuel pressure acts against one side of the washers while the air pressure acts against the other side. Since the air pressure is always greater than the fuel pressure, this will additionally aid in urging the washers to intimately contact the tubular members 39.

While not shown, the air supply to the spraybars may be bled from compressor discharge, and due to its peculiar action with respect to the fuel in the spraybars, it may be termed as an atomizing air, and will hereinafter be referred to as such. As far as overall engine performance is concerned, the air bled from the compressor is not lost in contrast to air driven accessories from which the air is exhausted overboard. The slight loss in efficiency lost from by-passing a small quantity of atomizing air around the turbine of the engine is compensated by an improved afterburner efficiency resulting from improved fuel distribution and atomization, and ultimately an increase in overall engine performance is obtained.

The fuel is thus introduced into the spraybar mixing chambers 32, while the atomizing air is introduced within the air tube 31 to be discharged through the air orifices and mix with the fuel and dispersed through the discharge orifices 30 of the outer tube 29 in a finely atomized spray of fuel into the afterburner chamber 16. Since the pressure in the mixing chamber 32 is always less than the atomizing air supply pressure, air flow through the spraybar 19 is then always available to assist in atomizing the fuel, and any possible back flow of fuel into the air supply line 34 is prevented. Thus, fuel atomization is achieved as a result of the relative velocity of air and fuel in the mixture flowing to the discharge orifices 30.

In addition to the positioning and variable distribution of the air atomizing spraybars, computed or metered fuel and sufficient air must be supplied to the spraybars to obtain and control variation in flame size, wherein the fuel delivered to the spraybar system is so computed or metered such that the proper fuel air ratio to support good combustion is maintained regardless of altitude, speed, or amount of thrust augmentation desired. Further, the fuel pressure is computed or controlled in such a manner that the ratio of atomizing air pressure to the fuel pressure is of such magnitude as to render good air atomizing fuel to the after-burner combustion chamber regardless of altitude, speed or amount of thrust augmentation desired. Hence, computed or metered fuel is supplied to the spraybars in such a manner that maximum fuel is delivered when the spraybars are in the thrust augmentation position and minimum fuel is delivered when the spraybars are in the minimum thrust augmentation position, and the amount of computed or metered fuel is infinitely variable between the minimum and maximum thrust augmentation position as desired.

The spraybars pivot in synchronism about the axes of the spraybar housings 28 in response to the air actuator and describe various conical or solid angles depending upon the degree of thrust augmentation desired. The maximum conical or solid angle would correspond to the maximum thrust augmentation position, wherein the spraybars would take the position as generally shown in solid lines in Figure 1, while the minimum conical or solid angle would render the minimum thrust augmentation, such as when the spraybars would take the position as shown in dotted lines in Figure 1. The spraybars are so constructed that their pivoted position may be infinitely variable between the minimum and maximum thrust augmentation position.

Now referring to Figure 3, a modified form of the invention is illustrated, wherein each spraybar housing 28A has mounted thereon only a single spray bar 19 instead of the double spraybar arrangement as shown in Figure 2. Except for this difference, the other component parts of this embodiment are identical with that shown in Figure 2 and similar parts are similarly numbered. It is only to be appreciated that in some instances, only a single spraybar on a single spraybar housing may be desired. The operation of the single spraybar arrangement is substantially identical with that of the double spraybar arrangement, and therefore need not be explained in detail.

It will be understood that modifications and variations may be effected without departing from the scope of the novel concepts of the present invention, but it is understood that this application is to be limited only by the scope of the appended claim.

I claim as my invention:

In a jet engine having an afterburner chamber, a fuel air distribution system for augmenting the thrust forces of the engine which comprises a flow passage leading to afterburners in the afterburner chamber, a plurality of elongated hollow spraybars annularly arranged in said flow passage to extend adjustably radially and having side orifices facing adjacent spraybars for forming a cone of pressure sprayed fuel, air mixing tubes extending axially into each of said hollow spraybars from the base with annular fuel chambers formed between said air tubes and said spraybars for flow of the fuel with air orifices in the air tubes substantially aligned with the spraybar orifices, a plurality of hollow spraybar housings annularly disposed substantially concentric with the flow passage, said hollow spraybars and said air tubes supported on the housings with the hollow housings communicating with the interior of the air tubes, bearing housings between each of the spraybar housings pivotally supporting the ends of the spraybar housings with alternate bearing housings being hollow and communicating with the interior of said spraybar housings, a tail cone within the flow passage enclosing said housings and having longitudinally elongated slots through which the spraybars extend, means defining air inlet openings into said alternate bearing housings for delivering pressurized air to adjacent spraybar housings on each side of said alternate bearing housings and to air tubes supported on the spraybar housings, means defining fuel supply conduits leading into bearing housings between said alternate housings and dividing to connect to spraybars on adjacent spraybar housings, air seals between the spraybar housings and the bearing housings to prevent leakage of air, actuating lever members connected to each of the spraybar housings, adjusting means connected to said lever members for adjustably positioning them through a range of positions so that the spraybars may be simultaneously pivotally adjusted to control the size of the fuel cone formed by the spray of fuel through the side orifices in the spraybars, and a controllable variable delivery fuel pump connected to deliver fuel to said fuel supply conduits.

References Cited in the file of this patent

UNITED STATES PATENTS

| | | |
|---|---|---|
| 1,952,236 | Clawson | Mar. 27, 1934 |
| 2,579,043 | Kallal | Dec. 18, 1951 |
| 2,595,759 | Buckland et al. | May 6, 1952 |
| 2,672,727 | Brown | Mar. 23, 1954 |
| 2,696,709 | Oulianoff | Dec. 14, 1954 |
| 2,771,740 | Johnson | Nov. 27, 1956 |
| 2,789,867 | Bloom et al. | Apr. 23, 1957 |
| 2,823,519 | Spalding | Feb. 18, 1958 |
| 2,861,424 | Jurisich | Nov. 25, 1958 |

FOREIGN PATENTS

| | | |
|---|---|---|
| 588,847 | Great Britain | June 4, 1947 |